May 1, 1934.　　　G. DOUGHERTY　　　1,957,252

GLASS TANK

Filed Dec. 20, 1929

INVENTOR
George Dougherty
by William B. Jaspert
his attorney.

Patented May 1, 1934

1,957,252

UNITED STATES PATENT OFFICE 1,957,252

GLASS TANK

George Dougherty, Morgantown, W. Va., assignor to Morgantown Glass Works, Morgantown, W. Va., a corporation of West Virginia Application December 20, 1929, Serial No. 415,414

1 Claim. (Cl. 49—54)

This invention relates to apparatus for and method of melting glass to provide a continuous supply of glass for the working tank of a ware forming machine.

This invention is particularly applicable to melting of glass intermittently for the manufacture of opaque or other glassware of different colors, and provides for continuously supplying glass to a working tank or feeder from which the ware forming machine receives its charge.

In the manufacture of glass on a commercial basis, the glass is melted in a "so-called" continuous glass melting tank in which raw batch material is charged in at one end and the glass flows continuously to a refining tank from which it is drawn to a working tank for suction feeders or direct to a ware forming machine by the so-called gob feeder method.

In the manufacture of opaque glass, the glass is preferably melted intermittently, that is, on account of the coloring pigments employed, a particular batch of glass must be used up within a limited time to prevent streaking of the glass resulting from the glass being left under fire for a too great period of time.

In melting opaque or other colored glass for the suction feeder type of machine, a constant level of the glass must be maintained in the working tank and the present invention provides for a method and apparatus for maintaining such a constant level of glass in the working tank at all times whereby the glass forming machine may be continuously operated.

Figure 1:
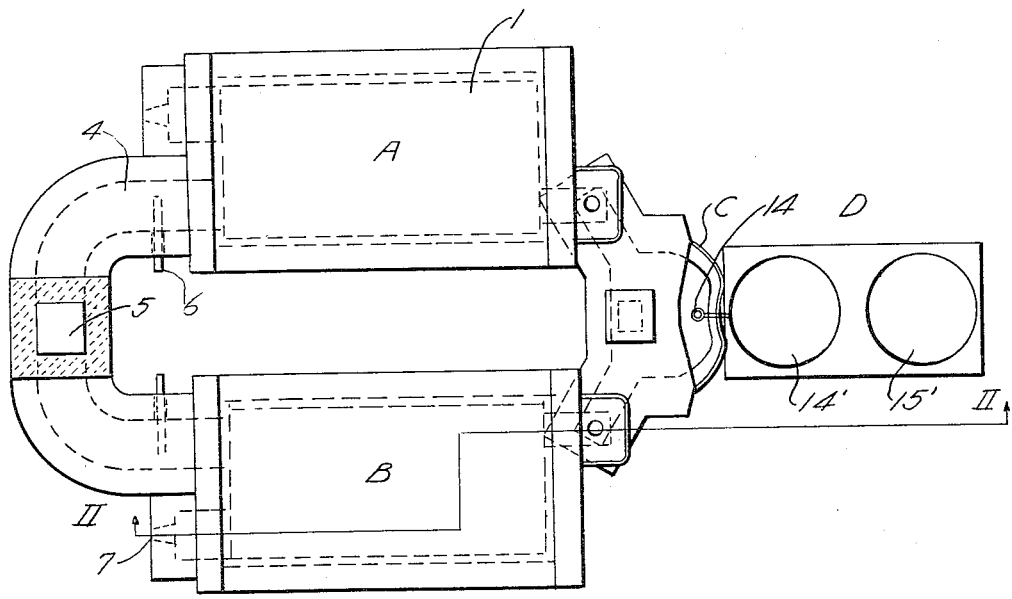
Figure 2:
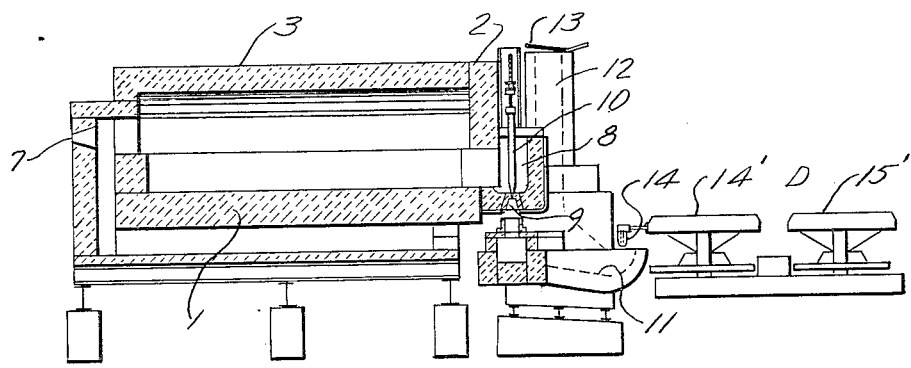

The invention is more readily understood in connection with the accompanying drawing in which like reference characters designate like parts and in which Figure 1 is a top plan view of a glass melting tank of two melting units having associated therewith a working tank and a ware-forming machine; Figure 2 is a cross sectional view of one of the tanks showing the outlet to the working tank in elevation and diagrammatically illustrating the associated ware-forming machinery.

With reference to both figures of the drawing, the structure therein illustrated comprises a pair of glass melting tanks, A and B, a working tank C, and a ware-forming machine D. The tanks consist of a refractory hearth 1 and a combustion chamber constituted by side and top walls 2 and 3 respectively. Flues 4 are provided which communicate with a common stack 5, and the flues are controlled by dampers 6. Openings 7 are provided for fuel injectors such as oil burners or the like which provide the heat for melting the glass and refining it in the combustion chamber.

The front ends of the melting tanks are provided with an extension chamber 8 having a submerged orifice 9 which is controlled by a plug 10 to regulate the flow of glass into the working tank C. The tank C is provided with a hollow hearth 11 for maintaining a glass pool at a constant level and this tank may be heated in a well known manner and provided with a flue 12 and damper 13 for controlling the products of combustion. The ware-forming machine, generally designated at D, is of the suction feed type employing parison molds 14 operating with a table 14' and which are lowered or otherwise brought into contact with the surface of the pool in the working tank. The charge of the parison molds is subsequently transferred to blow molds on table 15' on which it is finished and discharged.

In the operation of the glass melting tanks where they are paired in the manner shown in Fig. 1, tanks of relatively small capacity may be utilized and these tanks operated to supply glass to the working tank C by feeding the finished glass of one tank to the feeder while a fresh batch of raw material is being melted and refined in the other tank; thus when one of the tanks has been emptied, the other one will be in condition for use and the empty tank will be recharged to produce more glass.

In charging the tanks all of the material required for a given batch of glass is placed in the melting tank and subjected to the heat of combustion to melt the batch material and after melting to refine the same. As previously explained, the melting and refining of the glass batch must be effected within a given time to prevent the temperature of the glass rising to a point where the coloring material completely melts to produce the proper opacity or clearness of the refined glass as desired or required. Glass of this type is ordinarily melted and refined within a twelve hour period and must then be immediately utilized by the ware-forming machines to prevent its deterioration. By employing the two tanks of relatively small capacity glass of solid color may be formed without the formation of streaks and the glass is continuously drawn from one tank or the other to maintain a pool at fixed level in the working tank C from which it is continuously fed by suction to the ware-forming molds.

While the apparatus disclosed herein is particularly well adapted to the melting and working of opaque glass, it is equally useful for the melting and working of transparent glasses of various colors. For example, a change from one color to another may be made with the minimum loss of time and production. When the last batch of a given color of glass is drained from its tank, it requires but a fraction of an hour to remove the glass left in the working tank; then the new color may be turned into the working tank from the first melting tank and work proceeds. In a continuous tank tons of metal must be removed and delays of days and weeks endured until the change of colors can be effected. The advantage is, therefore, as applicable to one color or kind of glass, as to another.

Furthermore, with the intermittent melting unit, the color and quality of the glass may be checked, changed or corrected daily. Also, considerable time is saved when the furnace is renewed, relined, or repaired, and if one unit is not melting the other may continue to work and production is not entirely stopped. By this system of intermittent melting and constant feeding there is practically no resulting "cullet" as all glass melted, except the small quantity in the work tank, is made into glassware.

It is evident from the foregoing description of this invention that glass working apparatus made in accordance therewith provides for the intermittent melting of opaque solid or other colored glass, and continuous feeding or working of the melted glass in a simple and efficient manner.

It is further evident that various modifications may be made in the details of construction of the apparatus employed and in the arrangement of the several cooperating parts without departing from the principles of the invention herein set forth.

I claim herein as my invention:

Glass melting and feeding apparatus comprising in combination a plurality of individual shallow melting tanks of relatively small capacity, said tanks having a common waste gas passage with regulable means for controlling the flow of waste gases from the separate tanks and being further provided with separate heating means for operating said tanks at different temperatures if desired, said melting tanks being provided with forebay structures extending at one end thereof, and a forehearth co-extensive with said forebay having an exposed area from which the glass is gathered irrespective of the source from which it is supplied.

GEORGE DOUGHERTY.